Patented Feb. 24, 1931

1,793,962

UNITED STATES PATENT OFFICE

CURT RÄTH, OF RANGSDORF, GERMANY

PROCESS FOR THE PREPARATION OF SUBSTITUTION PRODUCTS OF PYRIDIN

No Drawing. Application filed June 23, 1925, Serial No. 39,150, and in Germany June 30, 1924.

The present invention relates to the preparation of valuable substitution products of pyridin. These new products are obtained by introducing iodine into the 5-position of 2-substituted pyridine compounds effect by the well known diazo method. This can be effected by causing the diazo solutions prepared from 2-substituted-5-aminopyridin by addition of alkali nitrite to their acid solution in the well known manner, to react with for instance potassium iodide, and the like.

By starting, for example, from 2-substituted-5-aminopyridin, which can be prepared comparatively easily, the reaction proceeds quite smoothly. Products resulting therefrom contain the iodine in the $\beta'$-position. In this way it is possible to get at compounds which show an exceedingly strong bactericidal effect.

Furthermore, I have found that I can prepare compounds of a particularly efficient nature and of great therapeutical value by having electro-negative substituents such as the hydroxy-group or the like, in the 2-position.

The following examples will illustrate my invention but I do not wish to be limited to the compounds disclosed.

Example 1

$\alpha$-chloro-$\beta'$-aminopyridin is diazotized in the usual way by adding to its acid solution sodium nitrite. The diazo solution thus prepared is poured into a solution of potassium iodide. The reaction starts immediately with a very violent evolution of nitrogen. By making alkaline and subsequently distilling with steam the $\alpha$-chloro-$\beta'$-iodopyridin is obtained in white leaflets with the melting point 99° centigrade.

The structural formula is

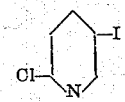

Example 2

$\alpha$-hydroxy-$\beta'$-aminopyridin is diazotized by the usual method. On treating the diazo solution in the manner described above in Example 1 the $\alpha$-hydroxy-$\beta'$-iodopyridin is obtained, the sodium salt of which forms white crystals which are easily soluble in water.

The structural formula is

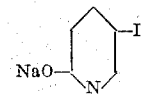

What I claim is
1. Process for the preparation of substitution products of pyridin which consists in diazotizing $\alpha$ substituted $\beta'$ amino pyridin and causing the diazo solution thus obtained to react with a metal iodide.
2. Process for the preparation of substitution products of pyridin which consists in diazotizing $\alpha$ hydroxy $\beta'$ amino pyridin and causing the diazo solution thus obtained to react with a metal iodide.
3. Process for the preparation of substitution products of pyridin which consists in diazotizing $\alpha$-hydroxy-$\beta'$-amino pyridin and causing the diazo solution thus prepared to react with potassium iodide.
4. As a composition of matter $\alpha$-hydroxy-$\beta'$-iodopyridin.

Signed at Berlin, in the country of Brandenburg and State of Prussia this 5th day of June, A. D. 1925.

DR. CURT RÄTH.